United States Patent
Hurd et al.

(10) Patent No.: US 10,432,888 B2
(45) Date of Patent: Oct. 1, 2019

(54) AUGMENTED REALITY DEVICE FOR LEVERAGING HIGH-ACCURACY GNSS DATA

(71) Applicant: Trimble Inc., Sunnyvale, CA (US)

(72) Inventors: Darrin Hurd, Christchurch (NZ); Farshad Nourozi, Rolleston (NZ)

(73) Assignee: Trimble Inc., Sunnyvale, CA (US)

(*) Notice: Subject to any disclaimer, the term of this patent is extended or adjusted under 35 U.S.C. 154(b) by 105 days.

(21) Appl. No.: 15/729,044

(22) Filed: Oct. 10, 2017

(65) Prior Publication Data

US 2019/0110016 A1   Apr. 11, 2019

(51) Int. Cl.
| | |
|---|---|
| H04N 5/445 | (2011.01) |
| G01S 19/45 | (2010.01) |
| G01S 19/14 | (2010.01) |
| G06T 19/00 | (2011.01) |
| G06T 7/70 | (2017.01) |
| H04N 5/232 | (2006.01) |
| G06T 19/20 | (2011.01) |
| G06T 7/32 | (2017.01) |
| G01S 19/53 | (2010.01) |
| G06F 3/01 | (2006.01) |

(52) U.S. Cl.
CPC ......... *H04N 5/44504* (2013.01); *G01S 19/14* (2013.01); *G01S 19/45* (2013.01); *G01S 19/53* (2013.01); *G06F 3/011* (2013.01); *G06T 7/32* (2017.01); *G06T 7/70* (2017.01); *G06T 19/006* (2013.01); *G06T 19/20* (2013.01); *H04N 5/23229* (2013.01); *G06T 2207/30244* (2013.01); *G06T 2219/2004* (2013.01); *G06T 2219/2016* (2013.01)

(58) Field of Classification Search
CPC ............ H04N 5/44504; H04N 5/23229; G01S 19/53; G01S 19/14; G01S 19/45; G06F 3/011; G06T 7/32; G06T 19/20; G06T 7/70; G06T 19/006; G06T 2219/2004; G06T 2207/30244; G06T 2219/2016

See application file for complete search history.

(56) References Cited

U.S. PATENT DOCUMENTS

| | | | |
|---|---|---|---|
| 6,064,335 | A | 5/2000 | Eschenbach |
| 6,124,825 | A | 9/2000 | Eschenbach |

(Continued)

OTHER PUBLICATIONS

Extended European Search Report for Application No. 18198879.1-1206 dated Mar. 1, 2019, 8 pages.

*Primary Examiner* — Jason A Flohre
(74) *Attorney, Agent, or Firm* — Kilpatrick Townsend & Stockton

(57) ABSTRACT

A method for displaying images using an AR device. GNSS position data is received based on wireless signals received from a GNSS satellite. Based on the GNSS position data, a first GNSS point within a geospatial frame is determined within a first time range and a second GNSS point within the geospatial frame is determined within a second time range. Based on camera POS data, a first AR point within an AR frame is determined within the first time range and a second AR point within the AR frame is determined within the second time range. One of the frames is shifted such that the second GNSS point is aligned with the second AR point. An angle formed by the GNSS points and the AR points is calculated. One of the frames is rotated by the angle.

20 Claims, 10 Drawing Sheets

(56) References Cited

U.S. PATENT DOCUMENTS

| | | |
|---|---|---|
| 7,245,999 B2 | 7/2007 | Dietsch et al. |
| 7,681,192 B2 | 3/2010 | Dietsch et al. |
| 8,478,492 B2 | 7/2013 | Taylor et al. |
| 2004/0051680 A1* | 3/2004 | Azuma ............... G03B 13/28 345/8 |
| 2009/0293012 A1* | 11/2009 | Alter .................. G01C 21/20 715/810 |
| 2012/0293325 A1 | 11/2012 | Lahcanski et al. |
| 2012/0293394 A1 | 11/2012 | Lahcanski |
| 2014/0247279 A1* | 9/2014 | Nicholas ............. G06T 19/006 345/633 |
| 2016/0284125 A1* | 9/2016 | Bostick ............... G06T 19/006 |

* cited by examiner

US 10,432,888 B2

AUGMENTED REALITY DEVICE FOR LEVERAGING HIGH-ACCURACY GNSS DATA

BACKGROUND

The recent growth of virtual reality (VR) and augmented reality (AR) technologies has been remarkable. In most implementations, VR and AR systems include devices that allow digitally reproduced images to be presented to a user in a manner wherein they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the actual world around the user.

Global navigation satellite systems (GNSS) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing.

Despite the progress of VR and AR technologies, linking VR and AR devices to high-accuracy GNSS data has proven difficult. Accordingly, there is a need in the art for improved methods and systems related to VR and AR technology.

SUMMARY

Embodiments of the present disclosure include a method for displaying images using an augmented reality (AR) device. The method may include receiving, from a global navigation satellite systems (GNSS) receiver, GNSS position data based on wireless signals received from a GNSS satellite. The method may also include determining, based on the GNSS position data, a first GNSS point within a geospatial frame at a first GNSS time within a first time range and a second GNSS point within the geospatial frame at a second GNSS time within a second time range, the first GNSS point and the second GNSS point forming a GNSS vector. The method may further include determining, based on camera position and orientation (POS) data generated by one or more cameras, a first AR point within an AR frame at a first AR time within the first time range and a second AR point within the AR frame at the second AR time within the second time range, the first AR point and the second AR point forming an AR vector. In some embodiments, the method may include shifting one of the geospatial frame and the AR frame such that the second GNSS point is aligned with the second AR point. The method may also include calculating an angle formed by the GNSS vector and the AR vector. The method may further include rotating one of the geospatial frame and the AR frame to the other of the geospatial frame and the AR frame by the angle.

In some embodiments, the method may include generating a model image based on model data, the shift, and the rotation. The method may also include generating a superimposed image by superimposing the model image onto a camera image generated by one of the one or more cameras. The method may further include defining a model within the geospatial frame based on the model data such that the model is shifted and rotated with the geospatial frame. In some embodiments, shifting one of the geospatial frame and the AR frame such that the second GNSS point is aligned with the second AR point includes shifting the geospatial frame such that the second GNSS point is aligned with the second AR point. In some embodiments, rotating one of the geospatial frame and the AR frame to the other of the geospatial frame and the AR frame by the angle includes rotating the geospatial frame to the AR frame by the angle.

In some embodiments, the method may include displaying, using the display, the superimposed image. The method may also include receiving the model data from a remote device via a wireless connection. The method may further include determining, based on the camera POS data, a camera orientation of one of the one or more cameras. In some embodiments, generating the model image is based on the model data, the shift, the rotation, and the camera orientation. In some embodiments, the method may include determining the camera orientation based on the camera POS data and accelerometer data generated by one or more accelerometers.

Embodiments of the present disclosure may include a non-transitory computer readable storage media comprising instructions to cause one or more processors within an AR device to perform operations comprising the described method. Embodiments of the present disclosure may also include an AR device including a GNSS receiver, an antenna, a radio frequency (RF) front end, a receiver processor, one or more cameras, a display, and a processor configured to perform the described method.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Embodiments of the present disclosure provide systems and methods for displaying images in an augmented reality (AR) device. Embodiments of the present disclosure solve the problem caused by vision-based position information and satellite-based position information not corresponding to each other and not being received and/or generated simultaneously by the AR device. For example, a user of an AR device may walk under a tree or into a building where satellite-based position information may be intermittent or only available once every few minutes. Similarly, a user of an AR device may enter a dark room where vision-based position information may be unavailable until better lighting conditions exist. Overall, satellite-based position information is generally received less frequent than vision-based position information, is more accurate than vision-based position information (centimeter accuracy), and does not suffer from initialization issues that are problematic with vision-based position information. These issues are overcome by maintaining two separate and independent frames: a vision-based frame (referred to as an AR frame) and a satellite-based frame (referred to as a geospatial frame), which are periodically aligned with each other by shifting and rotating one or both of the frames. This process improves camera position and orientation accuracy which in turn improves the accuracy of the displayed AR image.

Figure 1:
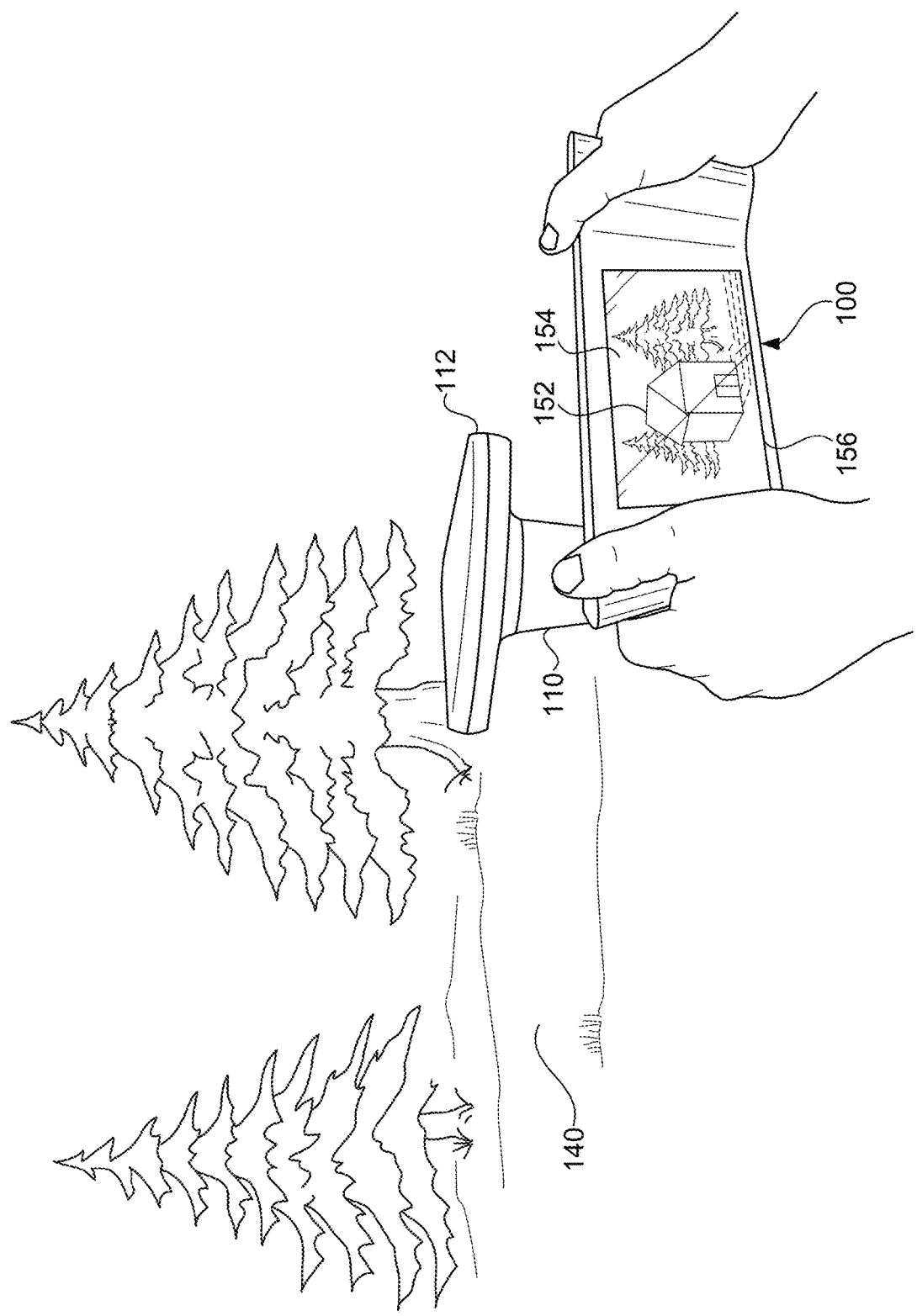
FIG. 1 illustrates an augmented reality (AR) device in use at a potential construction site, according to an embodiment of the present disclosure.

FIG. 1 illustrates an AR device 100 in use at a potential construction site 140, according to an embodiment of the present disclosure. AR device 100 may include a display 156 for displaying a model image 152 that is superimposed onto a camera image 154 (collectively referred to as a superimposed image 182), one or more cameras 160 (not shown in FIG. 1), and one or more accelerometers 162 (not shown in FIG. 1). In some embodiments, AR device 100 is coupled to, integrated with, and/or in data communication with a GNSS receiver 110. GNSS receiver 110 may include an antenna 112 and may be configured to provide high-accuracy position data of GNSS receiver 110. Where the spatial relationship between GNSS receiver 110 and a camera of AR device 100 is known, the position data generated by GNSS receiver 110 may be used to determine position data for the camera, allowing proper placement of model image 152 onto camera image 154. Although FIG. 1 depicts an outdoor setting, use of AR device 100 in various indoor settings is also possible.

Figure 2:
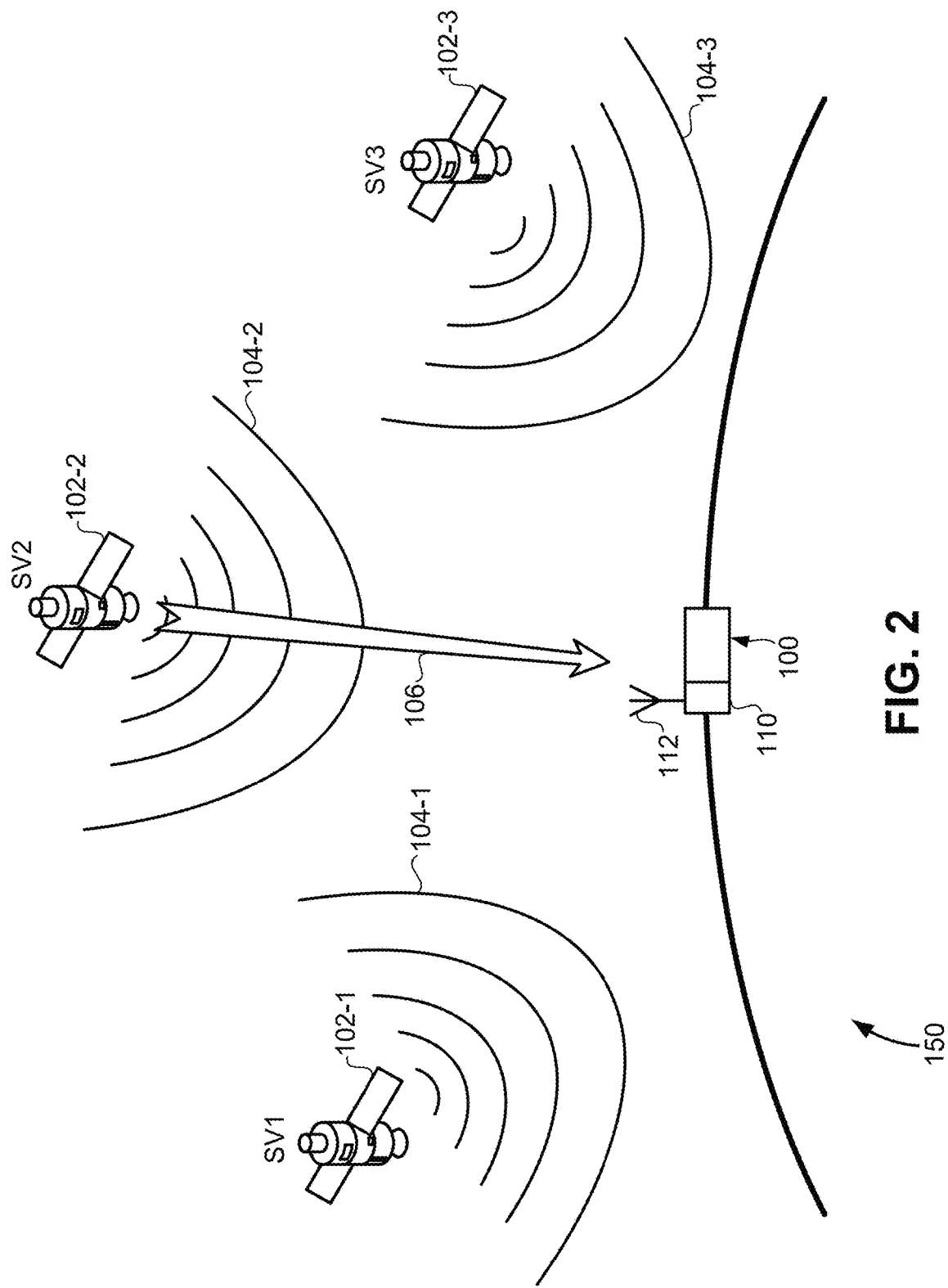
FIG. 2 illustrates an AR device implemented within a global navigation satellite system (GNSS), according to an embodiment of the present disclosure.

FIG. 2 illustrates AR device 100 implemented within a GNSS 150, according to an embodiment of the present disclosure. GNSS 150 includes one or more GNSS satellites 102, i.e., space vehicles (SV), in orbit above AR device 100. GNSS satellites 102 continuously, periodically, or intermittently broadcast wireless signals 104 containing PRN codes modulated onto carrier frequencies (e.g., L1 and/or L2 carrier frequencies). Broadcasted wireless signals 104 include both direct wireless signals 106, i.e., signals transmitted and received without reflection off objects, and reflected wireless signals, i.e., signals received by GNSS receiver 110 after reflection off at least one object. Direct wireless signals 106 and reflected wireless signals are received by antenna 112 positioned within, on, or near GNSS receiver 110, which may be a geodetic antenna, a rover antenna, or a handheld receiver antenna, among others. Wireless signals 104 corresponding to different GNSS satellites 102 may include different PRN codes that identify a particular GNSS satellite 102 such that GNSS receiver 110 may associate different distance estimates to different GNSS satellites 102. For example, GNSS satellite 102-1 broadcasts wireless signals 104-1 which contain a different PRN code than the PRN code contained in wireless signals 104-2 broadcasted by GNSS satellite 102-2. Similarly, GNSS satellite 102-3 broadcasts wireless signals 104-3 which contain a different PRN code than the PRN codes contained in wireless signals 104-1 and 104-2 broadcasted by GNSS satellites 102-1 and 102-2, respectively.

Merely by way of example, GNSS receiver 110 may use the three distance estimates between itself and GNSS satellites 102-1, 102-2, and 102-3 to generate a position estimate through a process called trilateration. Trilateration involves creating three spheres having center locations corresponding to the locations of the GNSS satellites 102 and radii corresponding to the distance estimates. The three spheres intersect at two locations, one of which is more plausible than the other given the position of the earth. The less plausible location is disregarded and the more plausible location is used as the position estimate for GNSS receiver 110. The position estimate may be continuously, periodically, or intermittently updated by generating new distance estimates and performing trilateration. Subsequent position estimates may benefit from previous position estimates through filtering processes (e.g., Kalman filtering) capable of improving position estimate accuracy. Position estimates may be determined using other techniques. In practice, a fourth satellite may be observed to estimate the receiver clock error with respect to the satellite system time.

Figure 3:
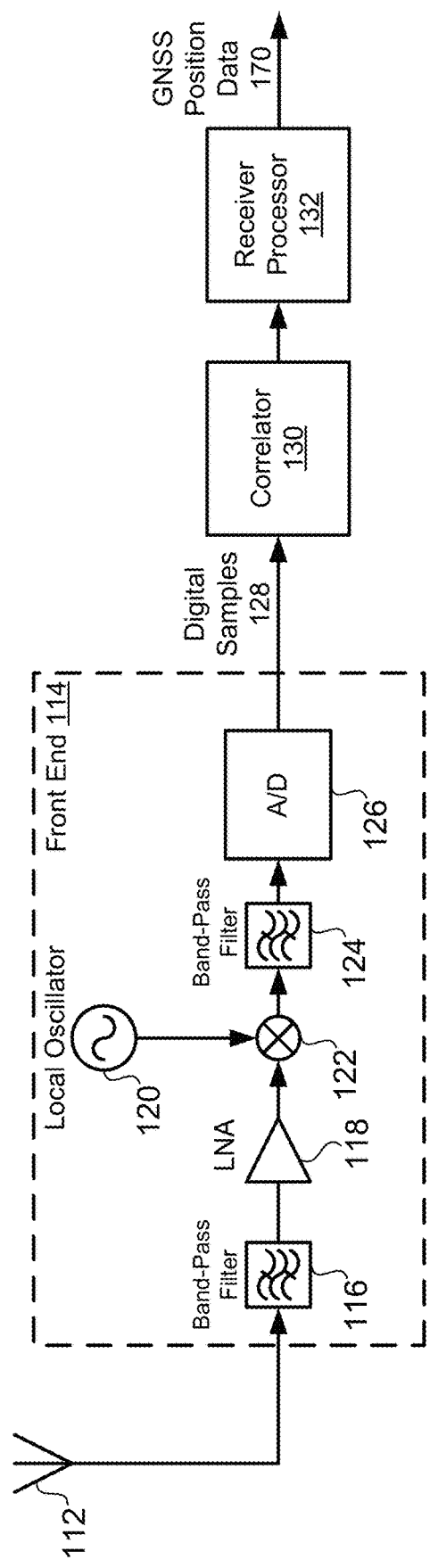
FIG. 3 illustrates a block diagram of a GNSS receiver, according to an embodiment of the present disclosure.

FIG. 3 illustrates a block diagram of GNSS receiver 110, according to an embodiment of the present disclosure. GNSS receiver 110 includes antenna 112 for receiving wireless signals 104 and sending/routing a signal related to wireless signals 104 to an RF front end 114. Antenna 112 may be linearly or circularly polarized, may be mounted or embedded, may be a single antenna or an array antenna, may have a narrow or wide bandwidth, among other possibilities. RF front ends are well known in the art, and in some instances include a band-pass filter 116 for initially filtering out undesirable frequency components outside the frequencies of interest, a low-noise amplifier (LNA) 118 for amplifying the received signal, a local oscillator 120 and a mixer 122 for down converting the received signal from RF to intermediate frequencies (IF), a band-pass filter 124 for removing frequency components outside IF, and an analog-to-digital (A/D) converter for sampling the received signal to generate digital samples 128.

In some instances, RF front end 114 includes additional or fewer components than that shown in FIG. 3. For example, RF front end 114 may include a second local oscillator (90 degrees out of phase with respect to the first), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to a correlator 130. In some embodiments, digital samples corresponding to both in-phase and quadrature components may be included in digital samples 128.

Other components within RF front end 114 may include a phase-locked loop (PLL) for synchronizing the phase of local oscillator 120 with the phase of the received signal, and a phase shifter for generating a second mixing signal using local oscillator 120 that is 90 degrees out of phase with local oscillator 120. In some embodiments, RF front end 114 does not include band-pass filter 116 and LNA 118. In some embodiments, A/D converter 126 is coupled directly to antenna 112 and samples the RF signal directly without down-conversion to IF. In some embodiments, RF front end 114 only includes band-pass filter 116 and A/D converter 126. Other possible configurations of RF front end 114 are possible.

Digital samples 128 generated by RF front end 114 are sent to a correlator 130 and/or a receiver processor 132. Correlator 130 performs one or more correlations on digital samples 128 using local codes. In some embodiments, one or more operations performed by correlator 130 may alternatively be performed by receiver processor 132. In some embodiments, correlator 130 is a specific piece of hardware, such as an application-specific integrated circuit (ASIC) or a field-programmable gate array (FPGA). In some embodiments, operations performed by correlator 130 are performed entirely in software using digital signal processing (DSP) techniques. Therefore, although correlator 130 and receiver processor 132 are depicted in FIG. 3 as two separate components, in some instances, they may be considered as a single component (and may be referred to collectively as receiver processor 132).

Based on multiple distance estimates corresponding to multiple GNSS satellites 102, GNSS receiver 110 (i.e., receiver processor 132) generates and outputs GNSS position data 170 comprising a plurality of GNSS points. Each of the plurality of GNSS points may be a 3D coordinate represented by three real numbers. In some embodiments, the three real numbers may correspond to latitude, longitude, and elevation. In other embodiments, the three real numbers may correspond to X, Y, and Z positions.

Figure 4:
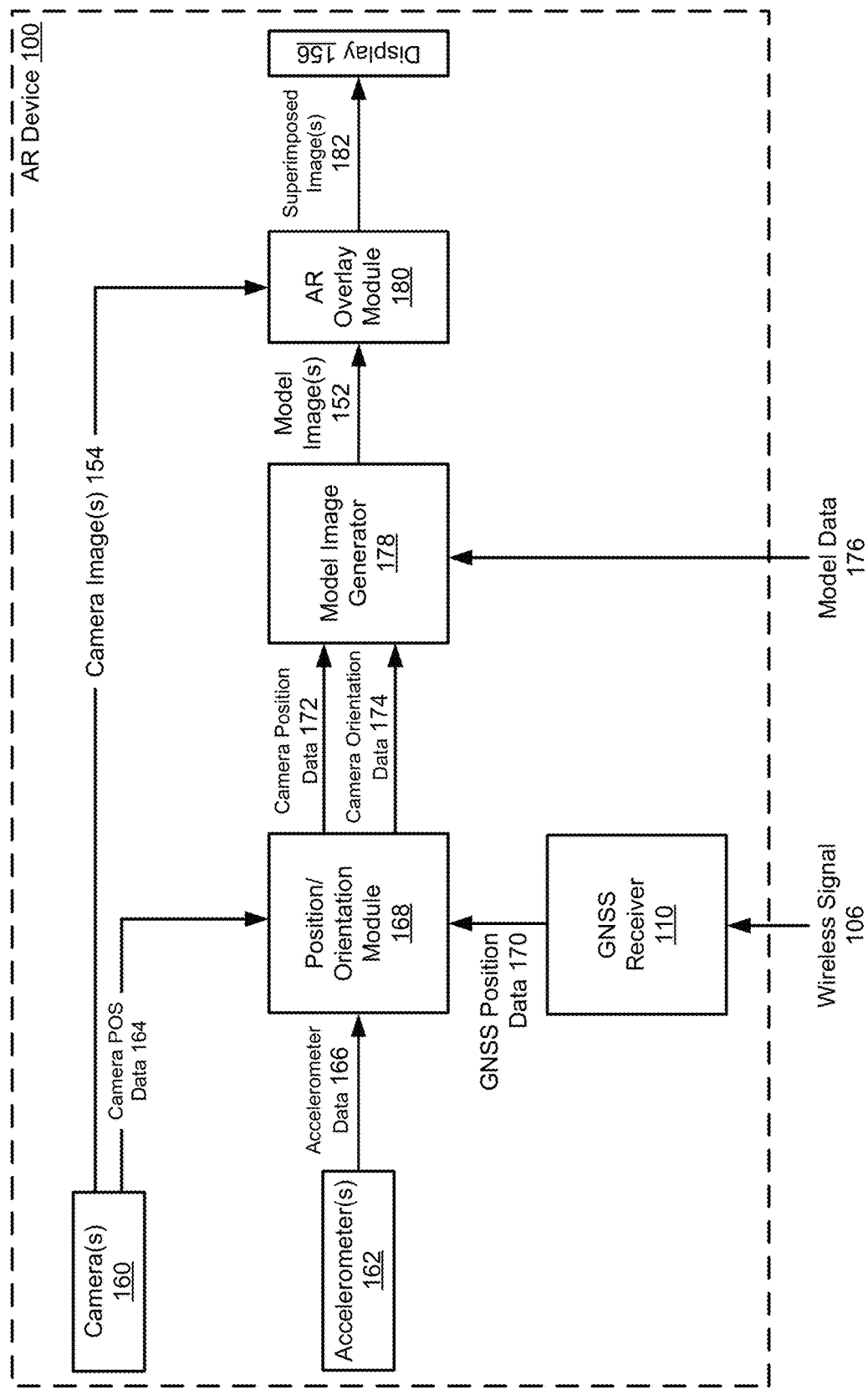
FIG. 4 illustrates a block diagram of an AR device, according to an embodiment of the present disclosure.

FIG. 4 illustrates a block diagram of AR device 100, according to an embodiment of the present disclosure. In some embodiments, AR device 100 includes one or more cameras 160 for generating camera position and orientation (POS) data 164 and for generating a single or multiple camera images 154. In some embodiments, the same camera used to generate camera POS data 164 may be used to generate camera image 154. In some embodiments, a wide-angle lens (e.g., fisheye lens) may be utilized for generating camera POS data 164 and a separate camera may be utilized for generating camera image 154. In some embodiments, camera POS data 164 may be generated using multiple cameras configured to generate 3D maps of the surroundings. Furthermore, cameras 160 may include infrared (IR) projectors and IR sensors or any other technology that allows depth information of the surroundings to be obtained.

In some embodiments, AR device 100 includes one or more accelerometers and gyroscopes 162 for generating accelerometer and gyroscope data 166 which is used to determine camera orientation. In some instances, a single MEMS sensor may act as a six axis inertial sensor to detect various types of rotation, including yaw, pitch, and roll, among other possibilities.

In some embodiments, AR device 100 includes a position/orientation module 168 for determining camera position data 172 and camera orientation data 174. Camera position data 172 may include a 3D coordinate (e.g., three real numbers) representing the relative position of camera 160 at a particular time. Similarly, camera orientation data 174 may include a 3D vector (e.g., three real numbers) representing the orientation of camera 160 at a particular time. Position/orientation module 168 may be configured to output positions and orientations periodically, at non-regular intervals, or upon receiving updated data from one or more of camera POS data 164, accelerometer data 166, and GNSS position data 170. Position/orientation module 168 may be implemented in hardware and/or software, among other possibilities.

In some embodiments, position/orientation module 168 routes GNSS position data 170 through as camera position data 172 immediately or soon after receiving new GNSS position data 170. In some embodiments, position/orientation module 168 routes camera POS data 164 through as camera position data 172 immediately or soon after receiving new camera POS data 164. In some instances, performance of AR device 100 is improved when camera POS data 164 and GNSS position data 170 are conjunctively used to determine camera position data 172. In some instances, this is accomplished by maintaining two separate and independent frames: an AR frame (corresponding to camera POS data 164) and a geospatial frame (corresponding to GNSS position data 170). The AR frame represents a camera space which maintains the relationship between different AR points (3D positions determined based on camera POS data 164). For example, a first AR point at a first time may be (0, 0, 0) within the AR frame, a second AR point at a second time may be (22.3, −12.6, 0) within the AR frame, and a third AR point at a third time may be (34.0, −22.9, −0.1) within the AR frame. Any operations performed on the AR frame, such as shifting or rotating, causes all points within the AR frame to be similarly affected. For example, shifting the AR frame by (0, 5, 0) would cause the three AR points to become (0, 5, 0), (22.3, −7.6, 0), and (34.0, −17.9, −0.1), respectively.

Similar to the AR frame, the geospatial frame represents a GNSS space which maintains the relationship between different GNSS points (3D positions determined based on GNSS position data 170). For example, a first GNSS point at a first time may be (10, 10, 10) within the geospatial frame, a second GNSS point at a second time may be (32.3, −2.6, 10) within the geospatial frame, and a third GNSS point at a third time may be (44.0, −12.9, 9.9) within the geospatial frame. Any operations performed on the geospatial frame, such as shifting or rotating, causes all points within the geospatial frame to be similarly affected. For example, shifting the geospatial frame by (0, 5, 0) would cause the three GNSS points to become (10, 15, 10), (32.3, 2.4, 10), and (44.0, −7.9, 9.9), respectively.

In an ideal scenario, AR points and GNSS points would be received by position/orientation module 168 simultaneously and would be identical to each other. However, due to the differences between the two technologies, this is generally not the case. For example, GNSS position data 170 is generally received less frequently than camera POS data 164, is generally more accurate and stable than camera POS data 164 (e.g., centimeter accuracy), and does not suffer from initialization issues that are problematic with camera POS data 164, e.g., the establishment of a new temporary local reference frame with the first AR point is generally set to (0, 0, 0). Furthermore, because of the initialization issues associated with camera POS data 164 (and also due to its inferior accuracy and drift over time and distance), the AR frame and the geospatial frame do not necessarily correspond to each other and therefore must be reconciled. To resolve these issues, among others, position/orientation module 168 may perform a series of steps in order to determine camera position data 172 and camera orientation data 174 that incorporate both camera POS data 164 and GNSS position data 170. These steps are illustrated in FIG. 5 by method 500 and are further detailed in reference to FIGS. 6A-6D.

In some embodiments, AR device 100 includes a model image generator 178 for generating a model image 152. In some instances, model image generator 178 receives model data 176 via a wired or wireless connection which defines a model (e.g., a building, a structure, a tree, underground utilities, etc.). Model data 176 may include 3D coordinates corresponding to the model as well as other information for generating model image 152, such as colors, textures, lighting, etc. In some embodiments, model image generator 178 generates model image 152 based on each of camera position data 172, camera orientation data 174, and model data 176. For example, as the camera position and/or orientation changes, model image 152 must also be modified to accurately reflect the difference in position and/or orientation (e.g., as the position of the camera gets further away from the position of the model, model image 152 must become smaller). In some embodiments, model image 152 is held static until a change in one or more of camera position data 172, camera orientation data 174, and model data 176 is detected by model image generator 178.

In some embodiments, AR device 100 includes an AR overlay module 180 for generating a superimposed image 182 by superimposing model image 152 onto camera image 154. AR overlay module 180 may crop model image 152 such that only the model is represented in model image 152. In some instances, superimposed image 182 is output to display 156 which displays superimposed image 182 for viewing by a user. In some instances, a user may select whether or not model image 152 is visible on display 156 or whether any transparency is applied to model image 152. Model image 152 may also be cropped based on the presence of any objects within camera image 154 that are determined to be closer to camera 160 than the model. For example, based on camera POS data 164, it may be determined that a tree within camera image 154 is closer to camera 160 than a building within model image 152. Model image 152 may then be cropped such that the tree appears in front of the building.

Figure 5:
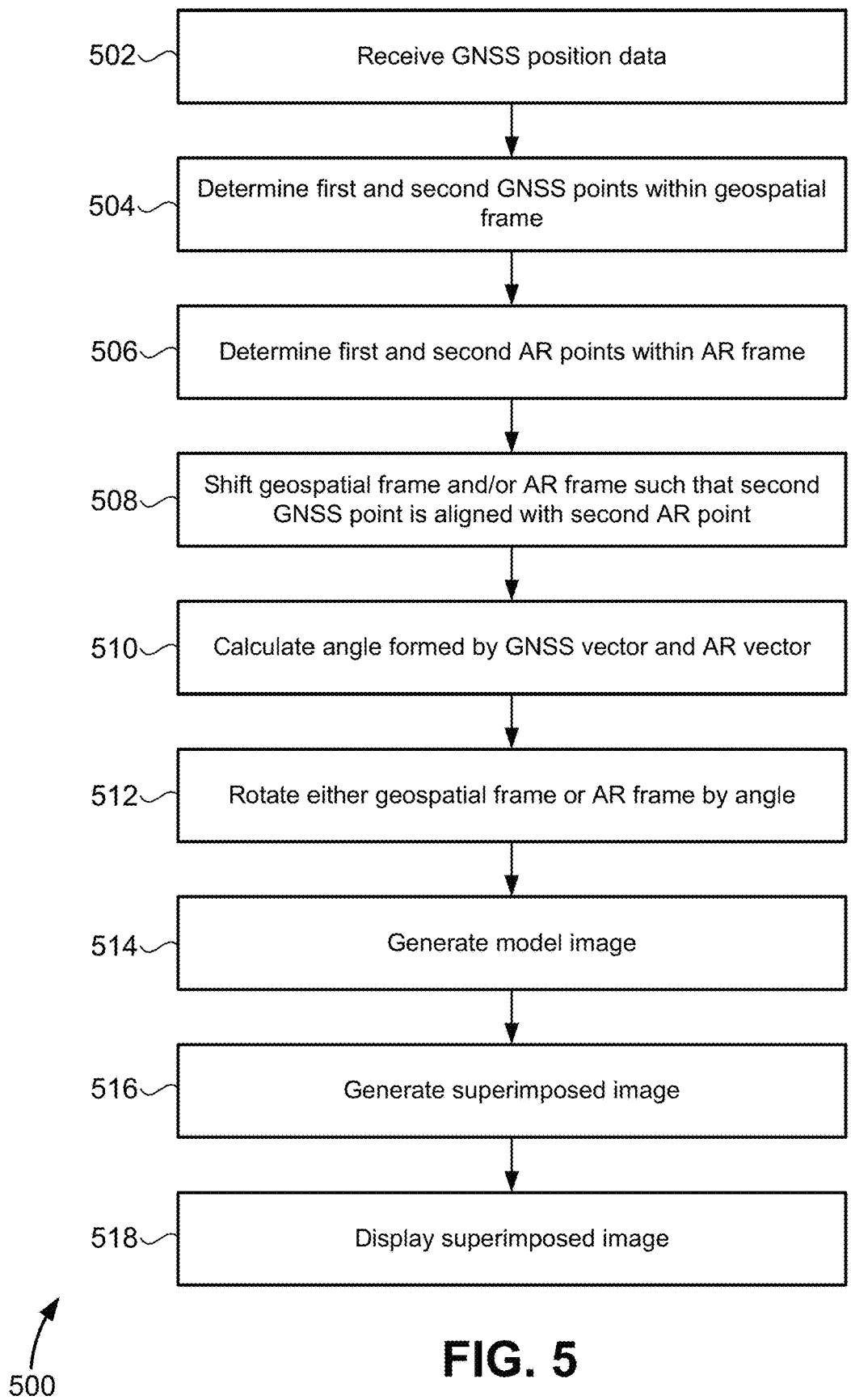
FIG. 5 illustrates a method for displaying images using an AR device, according to an embodiment of the present disclosure.

FIG. 5 illustrates a method 500 for displaying images using AR device 100, according to an embodiment of the present disclosure. Steps within method 500 may be performed in any order, and not all steps of method 500 need be performed. Method 500 may be performed continuously, periodically, or intermittently during operation of AR device 100, among other possibilities. At step 502, GNSS position data 170 is received by position/orientation module 168. In some embodiments, method 500 proceeds to step 504 after receiving any GNSS position data 170. In other embodiments, method 500 only proceeds to step 504 after receiving GNSS position data 170 having an accuracy level above a predetermined threshold. For example, because many GNSS receivers can determine an accuracy level along with each position estimate, these accuracy levels can be compared to the predetermined threshold prior to proceeding to step 504. In some embodiments, method 500 proceeds to step 504 after a certain amount of time despite not receiving GNSS position data 170 having an accuracy level above the predetermined threshold.

At step 504, position/orientation module 168 determines, based on GNSS position data 170, a first GNSS point within a geospatial frame at a first GNSS time within a first time range and a second GNSS point within the geospatial frame at a second GNSS time within a second time range. In some embodiments, the first GNSS point and the second GNSS point form a GNSS vector.

At step 506, position/orientation module 168 determines, based on camera POS data 164, a first AR point within an AR frame at a first AR time within the first time range and a second AR point within the AR frame at a second AR time within the second time range. In some embodiments, the first AR point and the second AR point form an AR vector. In some embodiments, the first time range and the second time range correspond to lengths of time. In one particular example, the first time range may be 27.3 to 30.1 seconds, the first GNSS time may be 28.6 seconds, and the first AR time may be 27.8 seconds. Continuing with the same example, the second time range may be 45.8 to 46.1 seconds, the second GNSS time may be 45.8 seconds, and the second AR time may be 46.0 seconds. In various embodiments, the first time range may have a length of 10 milliseconds, 100 milliseconds, 1 second, 10 seconds, 1 minute, and the like. Similarly, in various embodiments, the second time range may have a length of 10 milliseconds, 100 milliseconds, 1 second, 10 seconds, 1 minute, and the like. In some embodiments, the first time range and the second time range may not temporally overlap, although in other embodiments they may overlap by a minimal amount (e.g., 5%, 10% overlap).

At step 508, position/orientation module 168 shifts the geospatial frame and/or the AR frame such that the second GNSS point is aligned with the second AR point.

At step 510, position/orientation module 168 calculates the angle formed by the GNSS vector and the AR vector. In some embodiments, step 510 may be performed prior to step 508 as shifting one or both of the geospatial frame and the AR frame does not change the angle formed by the two vectors. In some embodiments, step 510 is performed concurrently with step 512.

At step 512, position/orientation module 168 rotates either the geospatial frame to the AR frame or the AR frame to the geospatial frame by the calculated angle, causing the GNSS vector to become aligned with the AR vector. In some embodiments, both the geospatial frame and the AR frame are rotated until the GNSS vector is aligned with the AR vector. For example, if the calculated angle is 45 degrees, the geospatial frame may be rotated by 45 degrees, the AR frame may be rotated by 45 degrees (in the opposite direction), or both frames may be rotated by amounts that sum to 45 degrees (e.g., 22.5 degrees each).

At step 514, model image generator 178 generates model image 152 based on model data 176, the shift performed in step 508, the rotation performed in step 512, camera position data 172, and/or camera orientation data 174. In general, proper functioning of AR device 100 may be achieved where the model defined by model data 176 is shifted and rotated along with the geospatial frame but not with the AR frame. For example, in some embodiments where only the geospatial frame is shifted and rotated, the model is shifted and rotated along with the geospatial frame so that it is displayed properly within model image 152. In other embodiments where only the AR frame is shifted and rotated, the model may retain its original coordinates.

At step 516, AR overlay module 180 generates superimposed image 182 by superimposing model image 152 onto camera image 154. At step 518, display 156 displays superimposed image 182.

FIGS. 6A-6D illustrate specific steps of a method for displaying images using AR device 100, according to an embodiment of the present disclosure. Specifically, FIG. 6A corresponds to steps 504 and 506, FIG. 6B corresponds to step 508, FIG. 6C corresponds to step 510, and FIG. 6D corresponds to step 512.

Figure 6A:
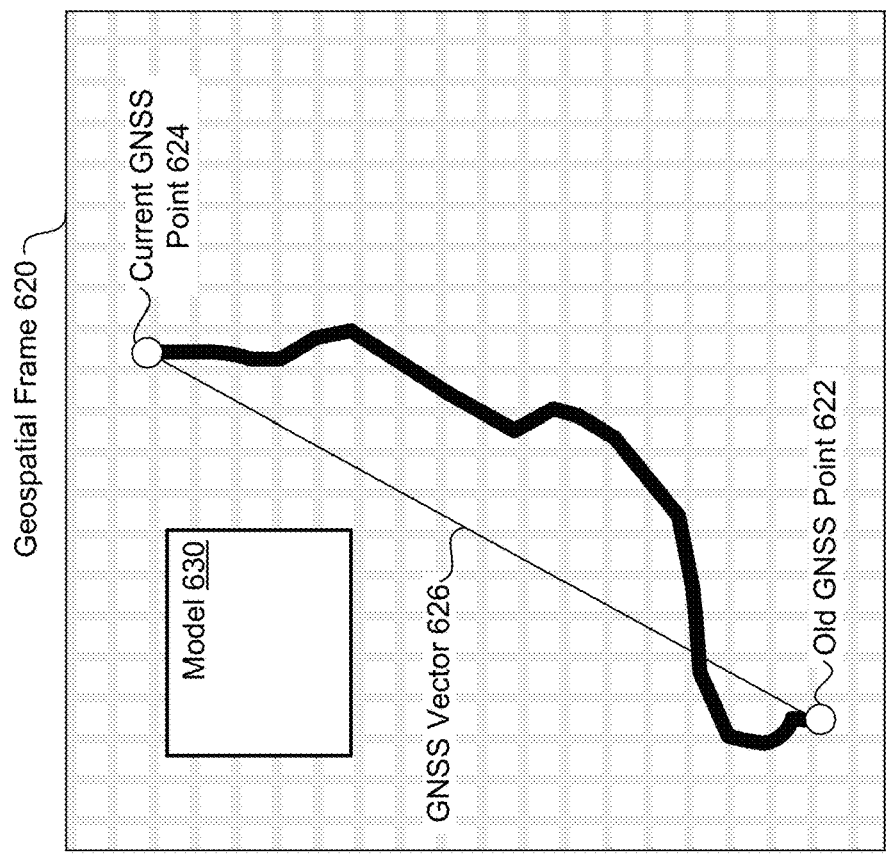
FIGS. 6A-6D illustrate specific steps of a method for displaying images in an AR device, according to an embodiment of the present disclosure.
Figure 6A:
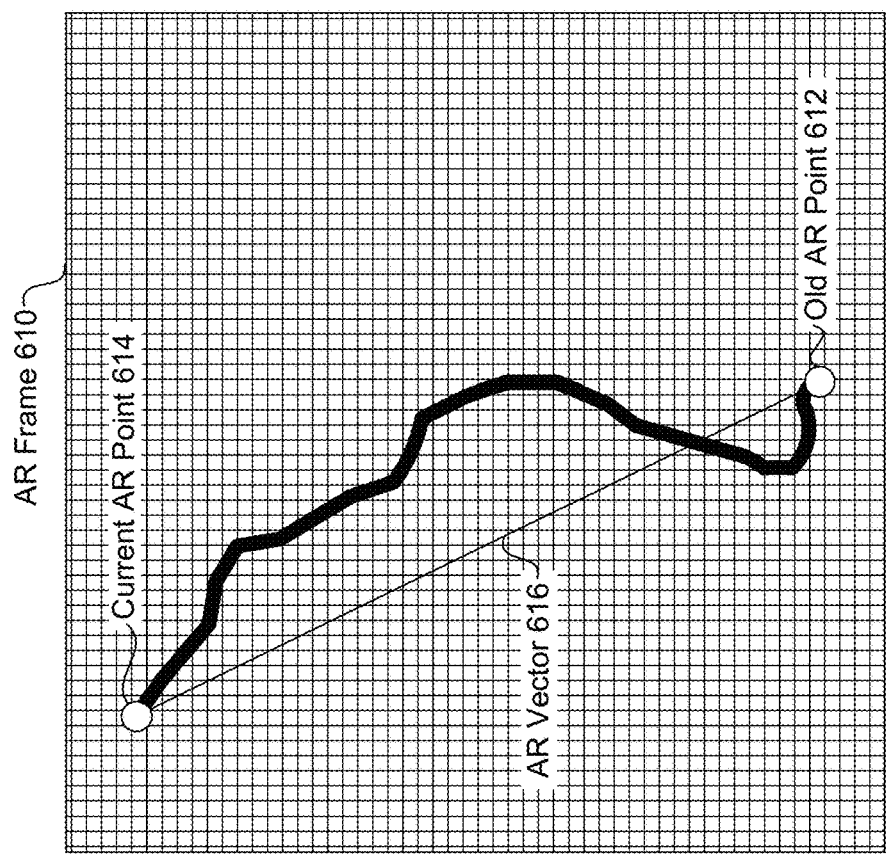

Referring to FIG. 6A, old GNSS point 622 within geospatial frame 620 and old AR point 612 within AR frame 610 may be determined at a first time, and current GNSS point 624 within geospatial frame 620 and current AR point 614 within AR frame 610 may be determined at a second time. Between the first time and the second time, additional points may be determined for both frames (as shown by the two thick solid lines). In some embodiments, the second time may be when an additional GNSS point becomes available after the first time. For example, although AR points may be determined on the milliseconds timescale, GNSS points may only be available every few seconds. GNSS points may be particularly delayed in situations where AR device 100 is being used with limited satellite visibility. For example, where AR device 100 is being used under a tree or in a building, GNSS points may only be available once every few minutes.

In some embodiments, a model 630 as defined by model data 176 may be configured within geospatial frame 620 as shown in FIG. 6A. For example, prior to performing any of steps 508, 510, and 512, model 630 may be included within geospatial frame 620 similar to old GNSS point 622 and current GNSS point 624 such that model 630 may be shifted and/or rotated along with geospatial frame 620. As described herein, model 630 may be a virtual representation of any number of structures, e.g., house, building, tree, underground utilities, etc.

Figure 6B:
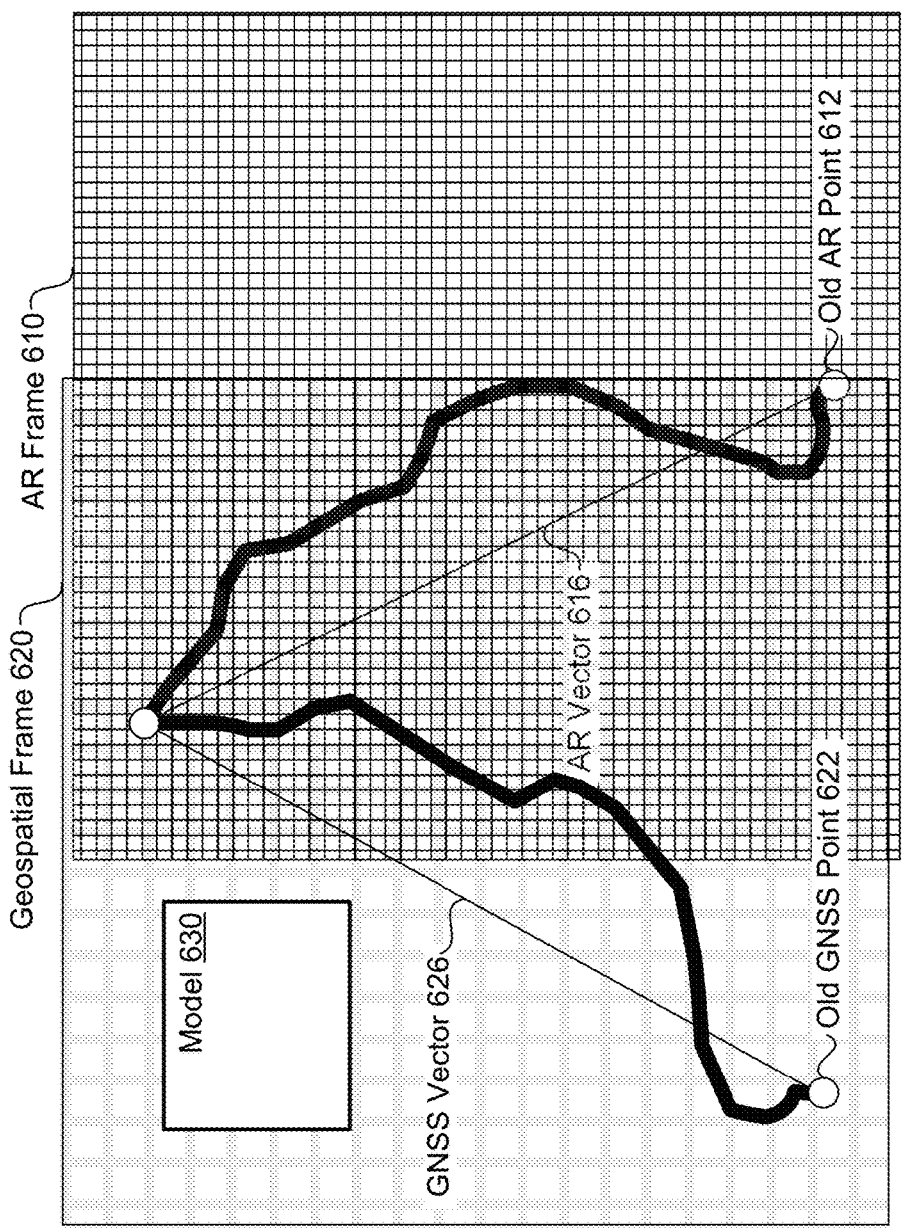

Referring to FIG. 6B, one or both of geospatial frame 620 and AR frame 610 may be shifted such that current GNSS point 624 is aligned with current AR point 614. Alignment may occur over several dimensions. For example, geospatial frame 610 may be shifted in each of three dimensions. Upon alignment of current GNSS point 624 with current AR point 614, GNSS vector 626 becomes aligned with AR vector 616 on at least one end of GNSS vector 626.

Figure 6C:
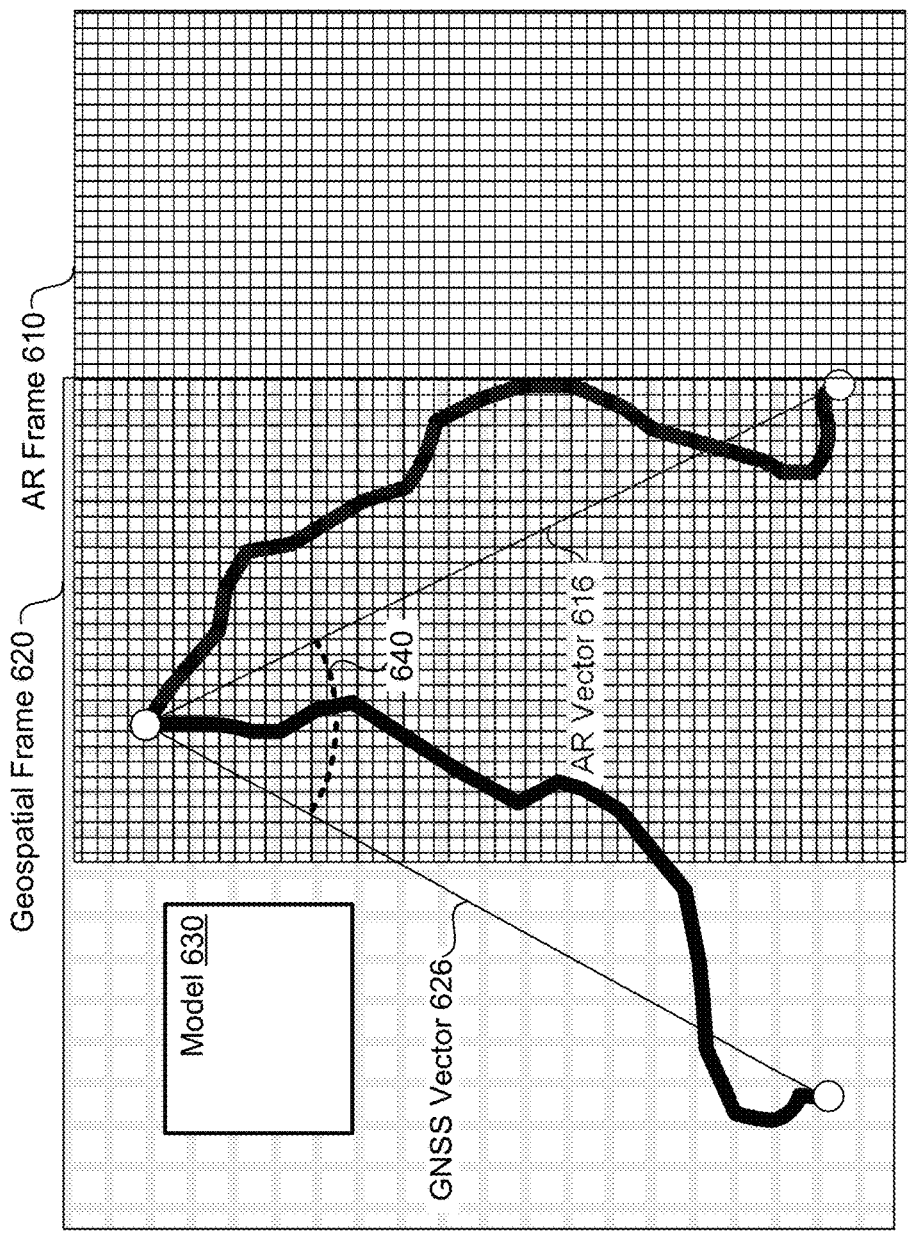
Figure 6D:
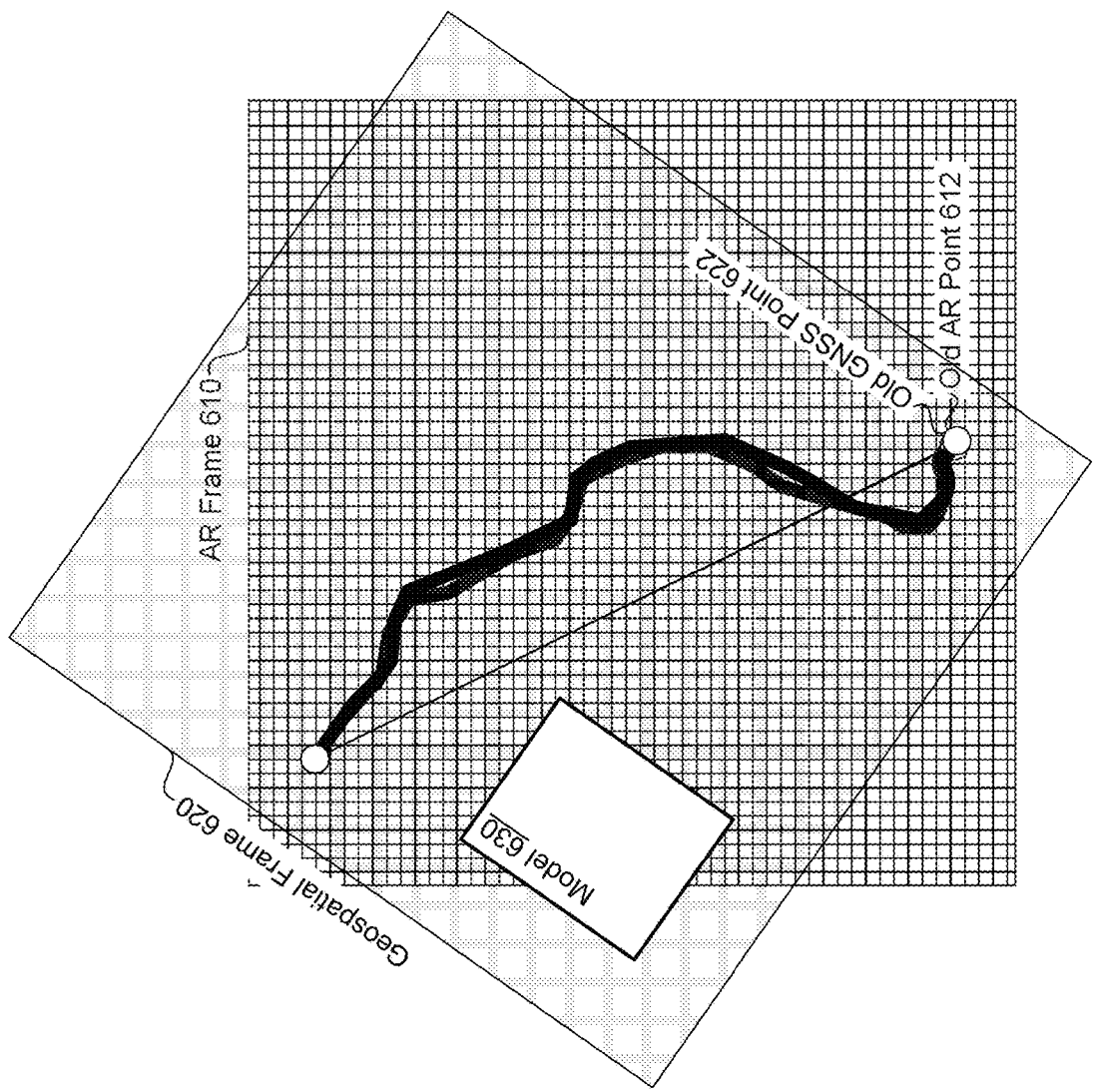

Referring to FIG. 6C, an angle 640 formed by GNSS vector 626 and AR vector 616 is calculated. Referring to FIG. 6D, either geospatial frame 620 is rotated to AR frame 610 or AR frame 610 is rotated to geospatial frame 620 by angle 640, causing GNSS vector 626 to become aligned with AR vector 616. In some embodiments, both geospatial frame 620 and AR frame 610 are rotated until GNSS vector 626 is aligned with AR vector 616. Rotation may occur over several dimensions. For example, geospatial frame 610 may be rotated in each of three dimensions.

Figure 7:
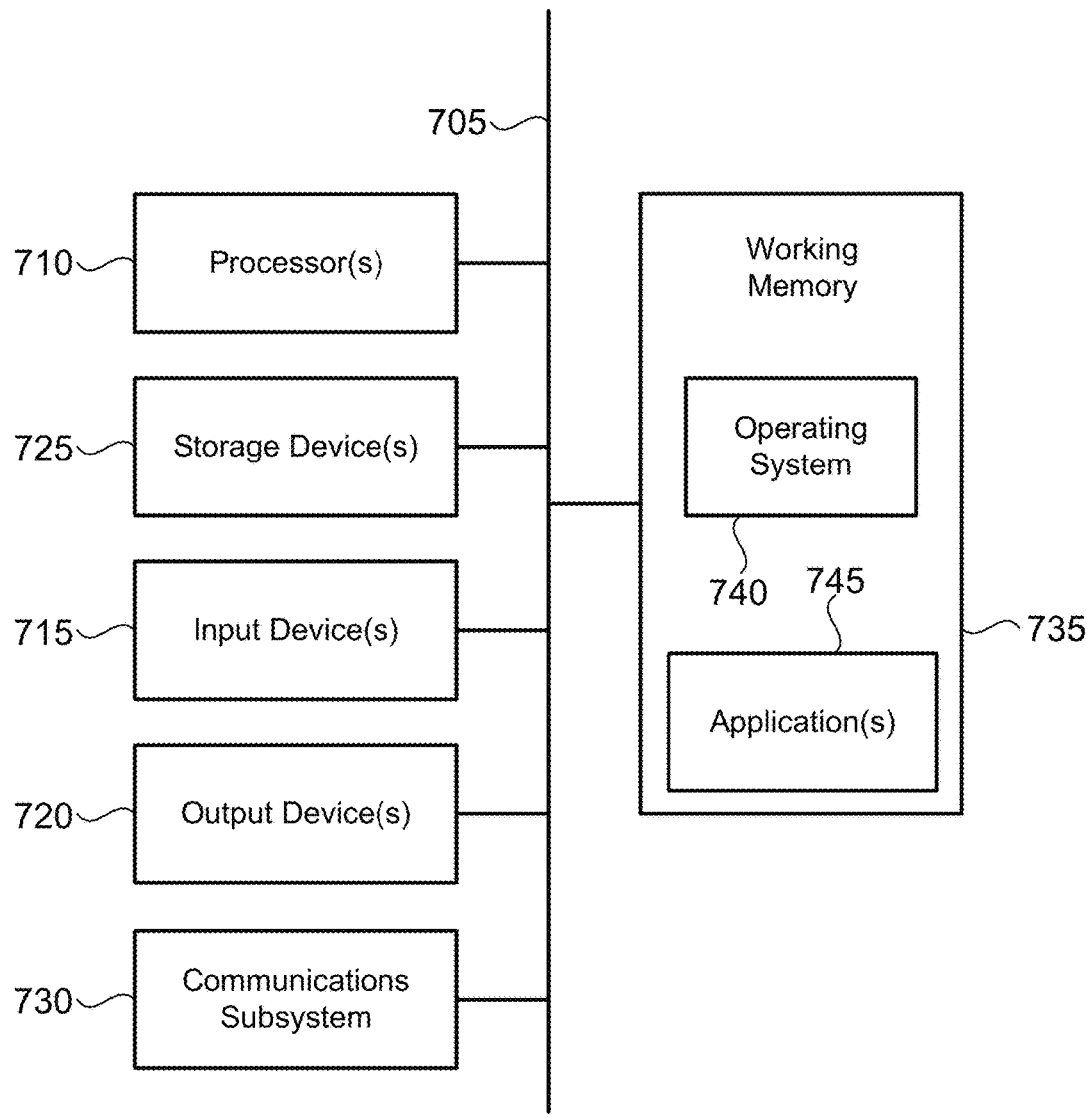
FIG. 7 illustrates a simplified computer system, according to an embodiment of the present disclosure.

FIG. 7 illustrates a simplified computer system 700, according to an embodiment of the present disclosure. A computer system 700 as illustrated in FIG. 7 may be incorporated into devices such as a portable electronic device, mobile phone, or other device as described herein. FIG. 7 provides a schematic illustration of one embodiment of a computer system 700 that can perform some or all of the steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or more integrated manner.

The computer system 700 is shown comprising hardware elements that can be electrically coupled via a bus 705, or may otherwise be in communication, as appropriate. The hardware elements may include one or more processors 710, including without limitation one or more general-purpose processors and/or one or more special-purpose processors such as digital signal processing chips, graphics acceleration processors, and/or the like; one or more input devices 715, which can include, without limitation a mouse, a keyboard, a camera, and/or the like; and one or more output devices 720, which can include, without limitation a display device, a printer, and/or the like.

The computer system 700 may further include and/or be in communication with one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 700 might also include a communications subsystem 730, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 730 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 730. In other embodiments, a portable electronic device, e.g. the first electronic device, may be incorporated into the computer system 700, e.g., an electronic device as an input device 715. In some embodiments, the computer system 700 will further comprise a working memory 735, which can include a RAM or ROM device, as described above.

The computer system 700 also can include software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 725 described above. In some cases, the storage medium might be incorporated within a computer system, such as computer system 700. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as the computer system 700 to perform methods in accordance with various embodiments of the technology. According to a set of embodiments, some or all of the procedures of such methods are performed by the computer system 700 in response to processor 710 executing one or more sequences of one or more instructions, which might be incorporated into the operating system 740 and/or other code, such as an application program 745, contained in the working memory 735. Such instructions may be read into the working memory 735 from another computer-readable medium, such as one or more of the storage device(s) 725. Merely by way of example, execution of the sequences of instructions contained in the working memory 735 might cause the processor(s) 710 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 and/or components thereof generally will receive signals, and the bus 705 then might carry the signals and/or the data, instructions, etc. carried by the signals to the working memory 735, from which the processor(s) 710 retrieves and executes the instructions. The instructions received by the working memory 735 may optionally be stored on a non-transitory storage device 725 either before or after execution by the processor(s) 710.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for displaying images using an augmented reality (AR) device, the method comprising:
receiving, from a global navigation satellite systems (GNSS) receiver, GNSS position data based on wireless signals received from a GNSS satellite;
determining, based on the GNSS position data, a first GNSS point within a geospatial frame at a first GNSS time within a first time range and a second GNSS point within the geospatial frame at a second GNSS time within a second time range, the first GNSS point and the second GNSS point forming a GNSS vector;
determining, based on camera position and orientation (POS) data generated by one or more cameras, a first AR point within an AR frame at a first AR time within the first time range and a second AR point within the AR frame at a second AR time within the second time range, the first AR point and the second AR point forming an AR vector;
shifting one of the geospatial frame and the AR frame such that the second GNSS point is aligned with the second AR point;
calculating an angle formed by the GNSS vector and the AR vector; and
rotating one of the geospatial frame and the AR frame to the other of the geospatial frame and the AR frame by the angle.

2. The method of claim 1, further comprising:
generating a model image based on model data, the shift, and the rotation; and
generating a superimposed image by superimposing the model image onto a camera image generated by one of the one or more cameras.

3. The method of claim 2, further comprising:
defining a model within the geospatial frame based on the model data such that the model is shifted and rotated with the geospatial frame;
wherein shifting one of the geospatial frame and the AR frame such that the second GNSS point is aligned with the second AR point includes shifting the geospatial frame such that the second GNSS point is aligned with the second AR point;
wherein rotating one of the geospatial frame and the AR frame to the other of the geospatial frame and the AR frame by the angle includes rotating the geospatial frame to the AR frame by the angle.

4. The method of claim 2, further comprising:
displaying, using the display, the superimposed image.

5. The method of claim 2, further comprising:
receiving the model data from a remote device via a wireless connection.

6. The method of claim 2, further comprising:
determining, based on the camera POS data, a camera orientation of one of the one or more cameras, wherein generating the model image is based on the model data, the shift, the rotation, and the camera orientation.

7. The method of claim 6, further comprising:
determining the camera orientation based on the camera POS data and accelerometer data generated by one or more accelerometers.

8. A non-transitory computer readable storage media comprising instructions to cause one or more processors within an augmented reality (AR) device to perform operations comprising:
receiving, from a global navigation satellite systems (GNSS) receiver, GNSS position data based on wireless signals received from a GNSS satellite;
determining, based on the GNSS position data, a first GNSS point within a geospatial frame at a first GNSS time within a first time range and a second GNSS point within the geospatial frame at a second GNSS time within a second time range, the first GNSS point and the second GNSS point forming a GNSS vector;
determining, based on camera position and orientation (POS) data generated by one or more cameras, a first AR point within an AR frame at a first AR time within the first time range and a second AR point within the AR frame at a second AR time within the second time range, the first AR point and the second AR point forming an AR vector;
shifting one of the geospatial frame and the AR frame such that the second GNSS point is aligned with the second AR point;
calculating an angle formed by the GNSS vector and the AR vector; and
rotating one of the geospatial frame and the AR frame to the other of the geospatial frame and the AR frame by the angle.

9. The non-transitory computer readable storage media of claim 8, wherein the operations further include:
generating a model image based on model data, the shift, and the rotation; and
generating a superimposed image by superimposing the model image onto a camera image generated by one of the one or more cameras.

10. The non-transitory computer readable storage media of claim 9, wherein the operations further include:
defining a model within the geospatial frame based on the model data such that the model is shifted and rotated with the geospatial frame;
wherein shifting one of the geospatial frame and the AR frame such that the second GNSS point is aligned with the second AR point includes shifting the geospatial frame such that the second GNSS point is aligned with the second AR point;
wherein rotating one of the geospatial frame and the AR frame to the other of the geospatial frame and the AR frame by the angle includes rotating the geospatial frame to the AR frame by the angle.

11. The non-transitory computer readable storage media of claim 9, wherein the operations further include:
displaying, using the display, the superimposed image.

12. The non-transitory computer readable storage media of claim 9, wherein the operations further include:
receiving the model data from a remote device via a wireless connection.

13. The non-transitory computer readable storage media of claim 9, wherein the operations further include:
determining, based on the camera POS data, a camera orientation of one of the one or more cameras, wherein generating the model image is based on the model data, the shift, the rotation, and the camera orientation.

14. The non-transitory computer readable storage media of claim 13, wherein the operations further include:
determining the camera orientation based on the camera POS data and accelerometer data generated by one or more accelerometers.

15. An augmented reality (AR) device comprising:
a global navigation satellite systems (GNSS) receiver including:
  an antenna for receiving wireless signals transmitted by a GNSS satellite;
  a radio frequency (RF) front end coupled to the antenna and configured to generate a plurality of samples related to the wireless signals; and
  a receiver processor coupled to the RF front end for generating GNSS position data based on the plurality of samples;
one or more cameras for generating camera position and orientation (POS) data and for generating a camera image;
a display for displaying a superimposed image;
a processor coupled to the GNSS receiver, the one or more cameras, and the display, the processor configured to perform operations including:
  receiving, from the GNSS receiver, the GNSS position data;
  determining, based on the GNSS position data, a first GNSS point within a geospatial frame at a first GNSS time within a first time range and a second GNSS point within the geospatial frame at a second GNSS time within a second time range, the first GNSS point and the second GNSS point forming a GNSS vector;
  determining, based on the camera POS data, a first AR point within an AR frame at a first AR time within the first time range and a second AR point within the AR frame at a second time within the second time range, the first AR point and the second AR point forming an AR vector;
  shifting one of the geospatial frame and the AR frame such that the second GNSS point is aligned with the second AR point;
  calculating an angle formed by the GNSS vector and the AR vector; and
  rotating one of the geospatial frame and the AR frame to the other of the geospatial frame and the AR frame by the angle.

16. The AR device of claim 15, wherein the operations further include:
  generating a model image based on model data, the shift, and the rotation; and
  generating the superimposed image by superimposing the model image onto the camera image.

17. The AR device of claim 16, wherein the operations further include:
  defining a model within the geospatial frame based on the model data such that the model is shifted and rotated with the geospatial frame;
  wherein shifting one of the geospatial frame and the AR frame such that the second GNSS point is aligned with the second AR point includes shifting the geospatial frame such that the second GNSS point is aligned with the second AR point;
  wherein rotating one of the geospatial frame and the AR frame to the other of the geospatial frame and the AR frame by the angle includes rotating the geospatial frame to the AR frame by the angle.

18. The AR device of claim 16, wherein the operations further include:
  displaying, using the display, the superimposed image.

19. The AR device of claim 16, wherein the operations further include:
  determining, based on the camera POS data, a camera orientation of one of the one or more cameras, wherein generating the model image is based on the model data, the shift, the rotation, and the camera orientation.

20. The AR device of claim 19, further comprising:
  one or more accelerometers for generating accelerometer data, wherein the camera orientation is determined based on the camera POS data and the accelerometer data.

* * * * *